(12) United States Patent
Burkett

(10) Patent No.: US 10,609,919 B2
(45) Date of Patent: Apr. 7, 2020

(54) TREE STAND

(71) Applicant: Jerry S. Burkett, Oakland, KY (US)

(72) Inventor: Jerry S. Burkett, Oakland, KY (US)

(*) Notice: Subject to any disclaimer, the term of this patent is extended or adjusted under 35 U.S.C. 154(b) by 0 days.

(21) Appl. No.: 15/972,292

(22) Filed: May 7, 2018

(65) Prior Publication Data

US 2019/0335742 A1 Nov. 7, 2019

(51) Int. Cl.
*A01M 31/02* (2006.01)

(52) U.S. Cl.
CPC .................... *A01M 31/02* (2013.01)

(58) Field of Classification Search
CPC ..................................... A01M 31/02
See application file for complete search history.

(56) References Cited

U.S. PATENT DOCUMENTS

| | | | | |
|---|---|---|---|---|
| 3,338,332 A * | 8/1967 | Brantly, Sr. | | A45F 3/26 108/151 |
| 3,419,108 A * | 12/1968 | Mobbs | | A01M 31/02 182/129 |
| 4,161,233 A * | 7/1979 | Wirtz | | A01M 31/02 108/2 |
| 4,667,773 A * | 5/1987 | Davis | | A01M 31/02 108/152 |
| 5,275,257 A * | 1/1994 | Robertson | | E06C 1/34 182/116 |
| 5,355,974 A * | 10/1994 | Miller | | A01M 31/02 108/152 |
| 5,695,099 A * | 12/1997 | Strum | | A01M 31/02 224/155 |
| 5,791,436 A * | 8/1998 | Talley, Sr. | | E06C 1/393 182/116 |
| D617,107 S * | 6/2010 | Thuente | | A01M 31/02 D6/362 |
| 2002/0148685 A1* | 10/2002 | Shan | | A01M 31/02 182/187 |
| 2010/0126803 A1* | 5/2010 | Cama | | A01M 31/02 182/187 |

FOREIGN PATENT DOCUMENTS

| | | | | |
|---|---|---|---|---|
| DE | 363402 C | * | 11/1922 | ............ A01M 31/02 |
| DE | 396969 C | * | 6/1924 | ............ A01M 31/02 |

\* cited by examiner

*Primary Examiner* — Alvin C Chin-Shue
(74) *Attorney, Agent, or Firm* — David L. Nocilly; Bond, Schoeneck & King, PLLC

(57) ABSTRACT

A tree stand that is easier to hang, has leveling adjustability, multiple configurations and improved comfort. The stand has a platform with a top, a bottom and a peripheral edge. A pivoting hook is mounted to the peripheral edge to encompass a tree trunk and rotates 180 degrees to allow optimal tree stand position. Two supports extend from the underside of the platform to additionally engage the tree trunk and allow for leveling of the tree stand. A sling chair is removably bolted to the top of the platform, which may be formed from 1×1 square tube and wire mesh so that the sling chair is positionable in a plurality of locations. The sling chair is aligned along a first axis that is perpendicular to a second axis extending from the tree trunk through the platform to improve user comfort, access and visibility in use.

5 Claims, 1 Drawing Sheet

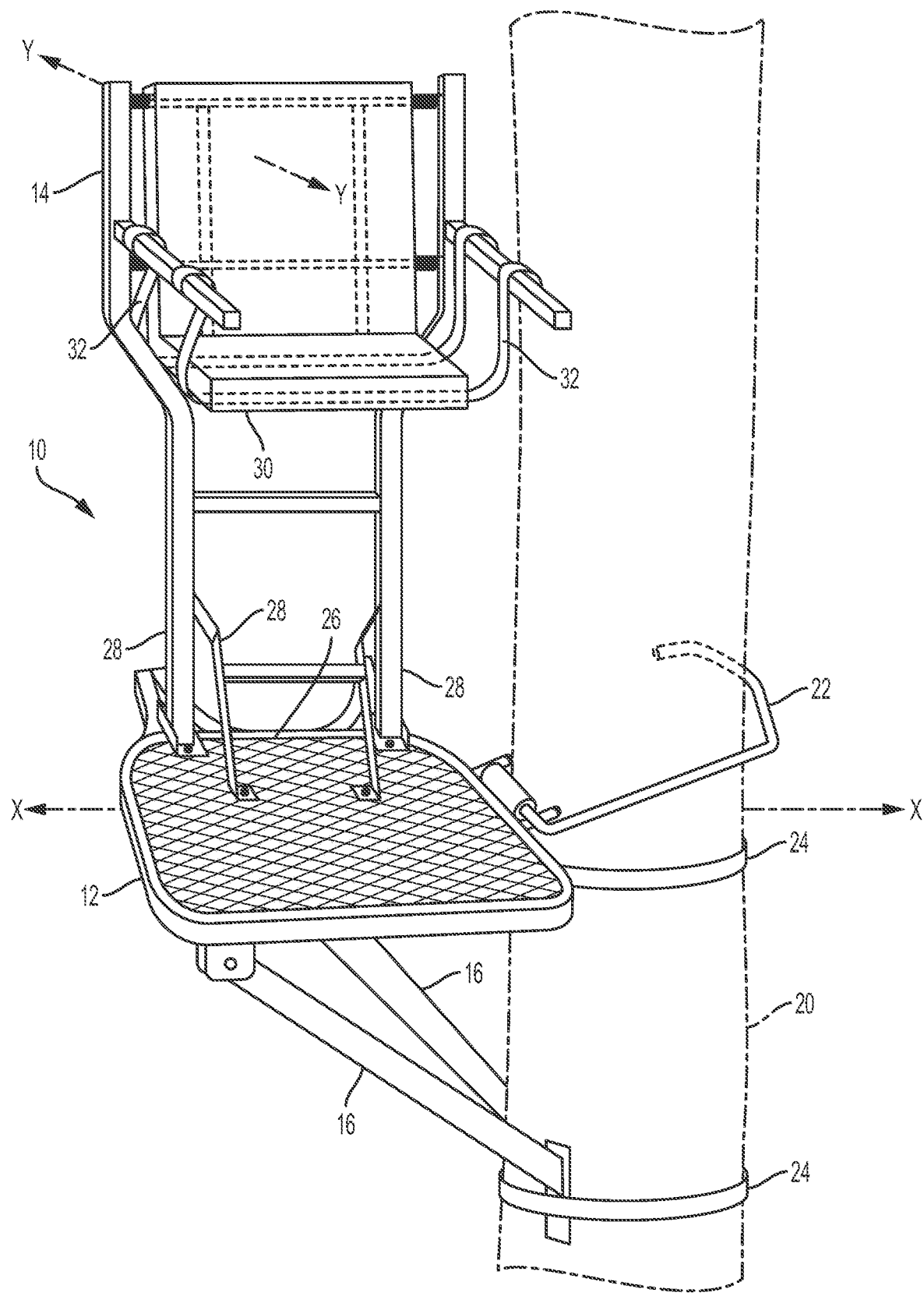

TREE STAND

BACKGROUND OF THE INVENTION

1. Field of the Invention

The present invention relates to tree stands for hunters and, more particularly, to a tree stand that is easy to hang and has leveling adjustability and comfortable.

2. Description of the Related Art

Tree stands or deer stands are platforms used by hunters that can be secured to a tree to elevate the hunter for an improved vantage point. As hunters will often spend long periods of time in a tree stand, many stand designs are hard to hang have no leveling adjustability and are not very comfortable. The designs of stands with seats do not optimally or safely position a hunter for firing from the seated position and provide very little range of movement. Accordingly, there is a need in the art for a tree stand that offers easy hanging, adjustability and a comfortable position without compromising visibility or safety.

BRIEF SUMMARY OF THE INVENTION

The present invention is a tree stand that is easy to hang, has adjustability and is comfortable. The stand has a platform with a top, a bottom and a peripheral edge. A pivoting hook is mounted proximately to the peripheral edge of the platform and dimensioned to encompass a multiple range of tree trunks to hold the tree stand in position to allow easier secure of tree stand. Two supports are pivotally mounted to the underside of the platform so that they can be pivoted into engagement with a tree and allow for leveling of the tree stand. The supports are mounted oppositely about the platform from the hook. A chair providing the seat is mounted to the top of the platform. The chair is a preferably sling chair that is removably bolted to the top of the platform. The platform may be formed so that the sling chair is positionable on the platform in a plurality of locations. The sling chair may be aligned along a first axis that is perpendicular to a second axis extending from the tree trunk through the platform to improve user access and visibility in use.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 is a perspective view of a tree stand having a seat according to the present invention.

DETAILED DESCRIPTION OF THE INVENTION

Referring to the FIGURES, wherein like numeral refer to like parts throughout, there is seen in FIG. 1 a tree stand 10 comprising a platform 12 having a folding chair 14 interconnected thereto. Platform 12 is preferably formed from one by one square tube and wire mesh to reduce weight and to allow for flexibility of positioning of chair 14, as described below. A pair of supports 16 are pivotally mounted to the underside of platform 12 and movable into engagement with a tree trunk 20. A tree hook 22 is pivotally coupled to one side of platform and extends from platform 12 to engage tree trunk 20. As seen in FIG. 1, straps 24 are used to secure supports 16 and/or platform 12 to tree trunk 20.

Hook 22 allows tree stand 10 to hang in tree 20 without strap 24 for easier securing of platform 12 using support 16 with strap 24. Hook 22 also detaches, rotates 180 degrees and reattaches to allow user to hang tree stand 10 on either side of tree 20. Hook 22 all so adapts to multiple range of tree diameters. Folding chair 14 is releasably secured to platform 12, such as by using wing bolts 26 that attached legs 28 of chair 14 to platform 12 using prepositioned riv-nuts. Wing bolts and riv-nuts allow for customized placement of folding chair 14 on platform 12. For example, the direction of chair 14 may be reversed by removing it and reinstalling it in the opposite direction on the opposite side of platform 12. Folding chair 14 preferably comprises a sling chair having a seat 30 suspended in place by a series of straps 32. Supports 16 are connected to platform 12 from the underside using bolts. Supports 16 can be adjusted in the vertical direction at the point of contact with tree 20 to adjust platform 12 into a level position to compensate for tree 20 that is slanted toward or away from the desired location of platform 12. Supports 16 can also be adjusted individually to adjust platform 12 to a level position to compensate for tree 20 that is slanted transversely relative to the desired location of platform 12. Stand 10 may then be collapsed by disconnecting the front pair of legs 28 so that chair 14 can be folded into a planar configuration against platform 12. As hook 22 and supports 16 also pivot, entire stand 10 can be easily folded into a planar configuration for easy transport.

As seen in FIG. 1, chair 14 is positioned so that the line of sight Y-Y of a user is perpendicular to line X-X that extends from tree trunk 20 through platform 12. As a result, a user does not have his or her view obstructed by tree trunk 20 and can more easily access and use platform 12 than if chair 14 and access were only by the front of platform 12 along line X-X.

What is claimed is:

1. A tree stand having a seat, comprising:
   a platform having a top, a bottom and a peripheral edge;
   a single pivoting hook mounted proximately at a single point to the peripheral edge of the platform for pivotal movement above the top of the platform, wherein the pivoting hook is dimensioned to encompass a tree trunk;
   a pair of supports pivotally mounted to the bottom of the platform oppositely from the single point of the pivoting hook; and
   a chair having a seat mounted to the top of the platform, wherein the chair is a sling chair removably bolted to the top of the platform and is positionable on the platform in a plurality of locations using wing bolts.

2. The tree stand of claim 1, wherein the pair of supports are mounted underside and oppositely about the platform from the hook to allow for leveling.

3. The tree stand of claim 2, wherein the platform is formed from a one by one square tube and wire mesh.

4. The tree stand of claim 2, wherein the sling chair is aligned along a first axis that is perpendicular to a second axis extending from the tree trunk through the platform.

5. The tree stand of claim 4, wherein the hook allows the tree stand to hang on trees having various dimensions.

* * * * *